(12) United States Patent
Nishii et al.

(10) Patent No.: US 7,335,130 B2
(45) Date of Patent: Feb. 26, 2008

(54) TOROIDAL-TYPE CONTINUOUSLY VARIABLE TRANSMISSION

(75) Inventors: Hiroki Nishii, Kanagawa (JP); Eiji Inoue, Kanagawa (JP)

(73) Assignee: NSK ltd., Tokyo (JP)

( * ) Notice: Subject to any disclaimer, the term of this patent is extended or adjusted under 35 U.S.C. 154(b) by 398 days.

(21) Appl. No.: 10/443,845

(22) Filed: May 23, 2003

(65) Prior Publication Data

US 2004/0018911 A1 Jan. 29, 2004

(30) Foreign Application Priority Data

May 23, 2002 (JP) ............................ P.2002-148665

(51) Int. Cl.
*F16H 15/38* (2006.01)

(52) U.S. Cl. .......................... 476/40; 476/42

(58) Field of Classification Search ................. 476/40, 476/42, 46; 403/65, 66, 76, 119, 122; 384/3, 384/5, 6
See application file for complete search history.

(56) References Cited

U.S. PATENT DOCUMENTS

| | | | | |
|---|---|---|---|---|
| 594,492 | A | * 11/1897 | Skiles | ............................ 384/2 |
| 1,686,377 | A | * 10/1928 | Hanson et al. | .................. 384/6 |
| 1,699,578 | A | * 1/1929 | Bates | ............................ 384/5 |
| 2,312,250 | A | * 2/1943 | Jacobus | .......................... 384/6 |
| 3,253,845 | A | * 5/1966 | Davies | ......................... 403/122 |
| 5,033,322 | A | 7/1991 | Nakano | |
| 5,676,618 | A | * 10/1997 | Nakano et al. | ................ 476/10 |
| 6,117,043 | A | 9/2000 | Imanishi et al. | |
| 6,676,294 | B2 | * 1/2004 | Harimoto et al. | ............... 384/2 |
| 6,846,264 | B2 | * 1/2005 | Sugihara | ....................... 476/40 |
| 2001/0016534 | A1 | * 8/2001 | Oshidari | ....................... 476/42 |
| 2002/0181999 | A1 | * 12/2002 | Raak et al. | .................. 403/122 |

FOREIGN PATENT DOCUMENTS

| | | | |
|---|---|---|---|
| JP | 2-283949 | A | 11/1990 |
| JP | 8-14351 | * | 1/1996 |
| JP | 8-14351 | A | 1/1996 |
| JP | 9-291997 | A | 11/1997 |
| JP | 11-141635 | A | 5/1999 |
| JP | 11-173393 | A | 6/1999 |
| JP | 2000-9200 | A | 1/2000 |
| JP | 2000-291756 | A | 10/2000 |
| JP | 2000-320634 | A | 11/2000 |
| JP | 2001-141012 | * | 5/2001 |
| JP | 2002-327817 | A | 11/2002 |

\* cited by examiner

*Primary Examiner*—William C. Joyce
(74) *Attorney, Agent, or Firm*—Sughrue Mion, PLLC

(57) ABSTRACT

A toroidal-type continuously variable transmission has a casing; an input disk and an output disk rotatably supported concentrically with each other; a plurality of power rollers each held between the input and output disks; a plurality of trunnions disposed at position twisted with respect to a center axis; a drive device for shifting the trunnions in the axial directions or the pivot shafts; a pair of yokes for supporting the pivot shafts of each of the trunnions so as to be swung and shifted in the axial direction thereof, the yokes being swingable according to the shifting movement of the associated trunnion; and, a pair of opposing members each disposed to be opposed to the associated yoke, wherein the yokes each includes projection portion contacted with the associated opposing member, the projection portion being the fulcrum of the swinging movements of the yokes.

10 Claims, 17 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission which is used, for example, as a transmission for a vehicle.

2. Description of the Related Art

A toroidal-type continuously variable transmission of a double cavity type used, for example, as a transmission for a vehicle is structured as shown in FIGS. 16 and 17.

As shown in FIG. 16, inside a casing 50, an input shaft (center shaft) 1 is rotatably supported and, on the outer periphery of the input shaft 1, two input disks 2, 2 and two output disks 3, 3 are mounted. Also, on the outer periphery of the middle portion of the input shaft 1, an output gear 4 is rotatably supported. In the central portion of the output gear 4, cylindrical-shaped flange portions 4a, 4a are formed; and, the output disks 3, 3 are connected by splint connection to the flange portions 4a, 4a respectively.

The input shaft 1 can be driven and rotated by a drive shaft 22 through a loading-cam-type pressing device 12 disposed between the input disk 2 situated on the left in FIG. 16 and a cam plate 7. Also, the output gear 4 is supported within the casing 50 through a partition wall 13 composed of two members connected together, whereby the output gear 4 can be rotated about the axis O of the input shaft 1 but is prevented from shifting in the direction of the axis O.

The output disks 3, 3 are supported by needle roller bearings 5, 5 each interposed between the input shaft 1 and themselves in such a manner that they can be rotated about the axis O of the input shaft 1.

Also, the input disk 2 situated on the left side in FIG. 16 is supported on the input shaft 1 through a ball spline 6, while the input disk 2 on the right side in FIG. 16 is spline connected to the input shaft 1; and, the two input disks 2 can be rotated together with the input shaft 1. And, between the inner surfaces 2a, 2a (concave-shaped surfaces) of the input disks 2, 2 and the inner surfaces 3a, 3a (concave-shaped surfaces) of the output disks 3, 3, power rollers 11 (see FIG. 17) are held in such a manner that they can be rotated.

In the inner peripheral surface 2c of the input disk 2 situated on the right side in FIG. 16, there is formed a stepped portion 2b; and, a stepped portion 1b formed in the outer peripheral surface 1a of the input shaft 1 is butted against the stepped portion 2b, while the back surface (in FIG. 16, the right surface) of the input disk 2 is butted against a loading nut 9. Due to this, the input disk 2 is substantially prevented from shifting in the axis O direction with respect to the input shaft 1. Also, between the cam plate 7 and the flange portion 1b of the input shaft 1, a countersunk spring 8 is interposed; and, the countersunk spring 8 applies a pressing force to the respective contact portions between the concave-shaped surfaces 2a, 2a, 3a, 3a of each disks 2, 2, 3, 3 and the peripheral surfaces 11a, 11a of the power rollers 11, 11.

Now, FIG. 17 is a section view taken along the line A-A shown in FIG. 16. As shown in FIG. 17, inside the casing 50, there are disposed a pair of trunnions 15, 15 each of which can be swung about a pair of pivot shafts 14, 14 disposed at positions twisted with respect to the input shaft 1. By the way, in FIG. 17, illustration of the input shaft 1 is omitted.

The two trunnions 15, 15 respectively include, in their respective two end portions which are situated in the longitudinal-direction (in FIG. 17, vertical-direction) of a support plate portion 16, a pair of bent wall portions 20, 20 which are formed to be bent on the inner surface side of the support plate portion 16. And, these bent wall portions 20, 20 form recess-shaped pocket portions P respectively for storing their associated power rollers 11 therein. Also, on the outer surfaces of the bent wall portions 20, 20, the pivot shafts 14, 14 are disposed in such a manner that they are concentric with each other.

A circular hole 21 is formed in the central portion of each of the support plate portions 16 and the base end portion 23a of a displacement shaft 23 is supported in the circular hole 21. And, in case where the trunnions 15, 15 are respectively swung about their associated pivot shafts 14, 14, the inclination angles of the displacement shafts 23 supported on the central portions of the trunnions 15, 15 can be adjusted. Also, on the peripheries of the leading end portions 23b of the displacement shafts 23 projecting from the inner surfaces of the trunnions 15, 15, there are rotatably supported the power rollers 11; and, the power rollers 11, 11 are interposed between the input disks 2, 2 and output disks 3, 3. By the way, the base end portions 23a and leading end portions 23b of the respective displacement shafts 23, 23 are eccentric to each other.

Also, the pivot shafts 14, 14 of the trunnions 15, 15 are respectively supported in such a manner that they can be swung and shifted in the axial direction thereof (in FIG. 16, in the front and back direction; and, in FIG. 17, in the vertical direction) with respect to a pair of yokes 23A, 23B; and, the yokes 23A, 23B prevent the trunnions 15, 15 from moving in the horizontal direction thereof.

As shown in FIG. 18, each of the yokes 23A, 23B is formed into a rectangular shape by press working or forging a blank member made of metal such as steel. In the four corners of the respective yokes 23A, 23B, there are formed four circular-shaped support holes 18, while the pivot shafts 14 disposed on the two end portions of the trunnion 15 are swingably supported on the support holes 18 through radial needle roller bearings 30.

Also, in the width-direction (in FIGS. 17 and 18, the right-and-left direction) central portion of each of the yokes 23A, 23B, there are formed circular-shaped engaging holes 19, while the inner peripheral surfaces of the engaging holes 19 are formed as spherical-shaped concave surfaces; and, spherical-shaped surface posts 64, 68 are respectively fitted into the engaging holes 19. That is, the yoke 23A situated on the upper side is swingably supported by the spherical-shaped surface post 64 which is supported on the casing 50 through a fixing member 52, while the lower-side yoke 23B is swingably supported by the spherical-shaped surface post 68 and the upper valve body 61 of a cylinder 31 supporting the spherical-shaped surface post 68.

By the way, the displacement shafts 23, 23 disposed on the trunnions 15, 15 are disposed at positions which are opposite by 180° to each other with respect to the input shaft 1. Also, the direction, in which the leading end portions 23b of the respective displacement shafts 23, 23 are eccentric to the base end portions 23a thereof, is the same direction (in FIG. 17, the reversed upward and downward direction) to the rotation direction of the two kinds of disks 2, 2, 3, 3. Also, the eccentric direction is a direction which is substantially perpendicular to the mounting direction of the input shaft 1. Therefore, the power rollers 11, 11 are supported in such a manner that they can be shifted slightly in the longitudinal direction of the input shaft 1. As a result of this, due to elastic deformation of each components based on thrust load generated by the pressing device 12, even when the power rollers 11, 11 tend to shift in the axial direction of the input shaft 1, an unreasonable force can be prevented from being applied to the respective composing parts of the toroidal-type continuously variable transmission and thus the shifting movements of the power rollers 11, 11 can be absorbed.

Also, between the outer surface of the power roller 11 and the inner surface of the support plate portion 16 so the trunnion 15, there are interposed a thrust ball bearing 24 and a thrust needle roller bearing 25, in this order, starting from the outer surface of the power roller 11 which are both thrust rolling bearings. Of these bearings, each of the thrust ball bearings 24 is structured such that, while supporting a thrust-direction load applied to the power roller 11, it allows the power roller 11 to rotate. Each of the thrust ball bearings 24 comprises a plurality of balls 26, 26, a circular-ring-shaped retainer 27 for holding the balls 26, 26 in such a manner that the balls 26 are allowed to roll, and a circular-ring-shaped outer race 28. Also, the inner race raceway of each thrust ball bearing 24 is formed in the outer surface of the power roller 11, whereas the outer race raceway thereof is formed in the inner surface of the outer race 28.

Also, the thrust needle roller bearing 25 is held by and between the inner surface of the support plate portion 16 of the trunnion 15 and the outer surface of the outer race 28. And, the thrust needle roller bearing 25 is structured such that, while supporting a thrust load applied to the outer race 28 from the power roller 11, it allows the power roller 11 and outer race 28 to swing about the base end portion 23*a* of their associated displacement shaft 23.

Further, on the one-end portions (in FIG. 17, the lower end portions) of the trunnions 15, 15, there are disposed drive rods (trunnion shafts) 29, 29 and, on the outer peripheral surfaces of the middle portions of the drive rods 29, 29, there are fixedly mounted drive pistons (oil-pressure pistons) 33, 33. And, these drive pistons 33, 33 are respectively oil-tight fitted into the drive cylinder 31 composed of the upper and lower valve bodies 61, 62. The drive pistons 33, 33 and drive cylinder 31 cooperate together in constituting a drive device 32 which can shift the trunnions 15, 15 in the axial directions of the pivot shafts 14, 14 of the trunnions 15, 15.

In the case of the thus-structured toroidal-type continuously variable transmission, the rotational movement of the input shaft 1 is transmitted through the pressing device 12 to the respective input disks 2, 2. And, the rotational movements of the input disks 2, 2 are transmitted through the pair of power rollers 11, 11 to the output disks 3, 3 and further the rotational movements of the output disks 3, 3 are taken out from the output gear 4.

To change a rotation speed ratio between the input shaft 1 and output gear 4, the pair of drive pistons 33, 33 may be shifted in the mutually opposite directions. With the shifting movements of the drive pistons 33, 33, the pair of trunnions 15, 15 are shifted in the mutually opposite directions, For example, the power roller 11 on the left side in FIG. 17 is shifted downwardly, whereas the power roller 11 on the right side is shifted upwardly. This changes the directions of tangential-direction forces acting on the contact portions between the peripheral surfaces 11*a*, 11*a* of the power rollers 11, 11 and the inner surfaces 2*a*, 2*a*, 3*a*, 3*a* of the input and output disks 2, 2, 3, 3. And, due to such change in the directions of these forces, the trunnions 15, 15 are swung in the mutually opposite directions about the pivot shafts 14, 14 pivotally supported on the yokes 23A, 23B.

This changes the contact positions between the peripheral surfaces 11*a*, 11*a* of the power rollers 11, 11 and the inner surfaces 2*a*, 3*a* of the input and output disks 2, 3 to thereby change a rotation speed ratio between the input shaft 1 and output gear 4. Also, in case where a torque to be transmitted between the input shaft 1 and output gear 4 varies and the elastic deformation quantities of the respective composing parts vary, the power rollers 11, 11 and outer races 28, 28 belonging to these power rollers 11, 11 are slightly rotated about the base end portions 23*a*, 23*a* of the displacement shafts 23, 23. Since the thrust needle roller bearings 25, 25 are interposed between the outer surfaces of the outer races 28, 28 and the inner surfaces of the support plate portions 16 respectively constituting their associated trunnions 15, 15, the slight rotational movements of the power rollers 11 and outer races 28 can be carried out smoothly. Therefore, the force necessary to change the inclination angles of the displacement shafts 23, 23 in the above-mentioned manner can be reduced down to a small level.

By the way, the yokes 23A, 23B, which support the pivot shafts 14, 14 of the trunnions 15, 15 swingably and shiftably in the axial direction, are structured such that, as described above, they can be swung about the spherical-shaped surface posts 64, 68 (for example, see U.S. Pat. No. 6,117,043). However, conventionally, there has been desired the development of a structure that can swing the yokes 23A, 23B more smoothly.

In attaining this desire, in JP-A-9-291997, there is disclosed a technique which can swing the yokes 23A, 23B about pins inserted into pin holes formed in the yokes 23A, 23B.

However, in this technique, when forming the pin holes in the yokes 23A, 23B, the formation positions of the pin holes must be set with high accuracy. This not only makes it difficult to manufacture the yokes 23A, 23B but also makes it necessary to provide the pins specially, which results in the increased number of parts used in the toroidal-type continuously variable transmission and in the increased manufacturing cost thereof.

SUMMARY OF THE INVENTION

The present invention aims at eliminating the above drawbacks found in the conventional toroidal-type continuously variable transmission. Accordingly, it is an object of the present invention to provide a toroidal-type continuously variable transmission which not only can facilitate the manufacturing of the yokes but also can reduce the manufacturing cost of the yokes and thus the toroidal-type continuously variable transmission.

In attaining the above object, according to a first aspect to the present invention, there is provided a toroidal-type continuously variable transmission, having a casing; an input disk and an output disk having inner surfaces respectively and rotatably supported concentrically with each other in the casing in such a manner that the inner surfaces are opposed to each other; a plurality of power rollers each held between the input and output disks; a plurality of trunnions each having a pair of pivot shafts disposed at positions twisted with respect to a center axis of the input and output disks and concentric with each other, the trunnion supporting the associated power roller so as to be rotated; a drive device for shifting the trunnions in the axial directions of the pivot shafts; a pair of yokes for supporting the pivot shafts of each of the trunnions so as to be swung and shifted in the axial direction thereof, the yokes being swingable according to the shifting movement of the associated trunnion; and, a pair of opposing members each disposed to he opposed to the associated yoke, wherein the yokes each includes projection portion contacted with the associated opposing member, the projection portion being the fulcrum of the swinging movements of the yokes.

According to the present invention, the projection portions of the yokes are contacted with their associated opposing members (such as a casing or a cylinder for storing therein a piston for shifting the trunnion), whereby the yokes can be swung about these projection portions to thereby synchronize the shifting movements of the trunnions supported on the yokes.

In this manner, since the yokes swing about the projection portions contacted with the opposing members, the yokes are allowed to swing smoothly. Therefore, the shifting movements of the trunnions supported on the yokes can be synchronized stably, thereby being able to stabilize the transmission performance of the toroidal-type continuously variable transmission.

Also, because the structure can be obtained by forming the projection portions in the yokes, the manufacture of the yokes is easy and also there is eliminated the need for special provision of pins, thereby being able to reduce the manufacturing cost of the toroidal-type continuously variable transmission.

According to a second aspect of the present invention, there is provided a toroidal-type continuously variable transmission, having a casing; an input disk and an output disk having inner surfaces respectively and rotatably supported concentrically with each other in the casing in such a manner that the inner surfaces are opposed to each other; a plurality of power rollers each held between the input and output disks; a plurality of trunnions each having a pair of pivot shafts disposed at positions twisted with respect to a center axis of the input and output disks and concentric with each other, the trunnion supporting the associated power roller so as to be rotated; a drive device for shifting the trunnions in the axial directions of the pivot shafts; a pair of yokes for supporting the pivot shafts of each of the trunnions so as to be swung and shifted in the axial direction thereof, the yokes being swingable according to the shifting movement of the associated trunnion; and, a pair of opposing members each disposed to be opposed to the associated yoke, wherein the opposing members each includes projection portion contacted with the associated yoke, the projection portion being the fulcrum of the swinging movements of the yokes.

According to the second aspect of the present invention, the projection portions of the opposing members are contacted with their associated yokes, whereby the yokes can be swung about these projection portions to thereby synchronize the shifting movements of the trunnions supported on the yokes.

In this manner, since the yokes are structured so as to swing about the projection portions formed in the opposing members and contacted with the yokes, the yokes are allowed to swing smoothly. Therefore, the shifting movements of the trunnions supported on the yokes can be synchronized stably, thereby being able to stabilize the transmission performance of the toroidal-type continuously variable transmission.

Also, because the structure can be obtained by forming the projection portions in the opposing members, the manufacture of the yokes is easy and also there is eliminated the need for special provision of pins, thereby being able to reduce the manufacturing cost of the yokes and thus the toroidal-type continuously variable transmission.

According to the present invention, the toroidal-type continuously variable transmission as set forth in the first or second aspect, wherein each of the yokes forms a penetration hole therein, the toroidal-type continuously variable transmission further includes a restricting member inserted into the penetration hole of the yoke and restricting the movement of the yoke in the horizontal direction, and a clearance is formed between the restricting member and the penetration hole.

According to the present structure, since there is formed a clearance between the restricting member and the penetration hole of the yoke, the yoke is allowed to move in the horizontal direction only by the amount corresponding to this clearance. Therefore, even in case where the positions of the contact portions between the peripheral surfaces of the power rollers and the inner surfaces of the input and output disks are caused to vary in the respective power rollers due to the shifted position of the yokes within the casing or due to variations in the assembling positions of the power rollers with respect to the trunnions. The yokes are allowed to move in the horizontal direction to thereby correct the variations in the positions of the contact portions between the peripheral surfaces of the power rollers and the inner surfaces of the input and output disks. Thanks to this, loads to be applied to the respective power rollers can be made uniform, so that the durability of the power rollers is not lowered but the lives of the power rollers can be extended.

Also, because there is eliminated the need to set the positions of the yokes within the casing and the assembling positions of the power rollers with respect the trunnions with accuracy so as to be able to prevent the durability of the power rollers from being lowered, the operation for assembling these composing parts is easy.

Further, according to the present invention, the toroidal-type continuously variable transmission as set forth in the first aspect of the present invention, wherein, in each of the opposing members, a recess portion into which a leading end portion of the projection portion of each of the yoke is inserted is formed.

That is, according to the present structure, by inserting the leading end portions of the projection portions of the yokes into the recess portions formed in the opposing members, the yokes can be swingably supported in the recess portions of the opposing members. Thanks to this, the centers of the swinging movements of the yokes can be made always constant, which makes it possible to stabilize the swinging movements of the yokes.

Also, since there is eliminated the need for provision of posts and pins which are used to support the yokes swingably, there can be avoided not only the operation to form holes in the yokes for insertion of the posts and pins but also the operation to assemble the pins to the yokes, which makes it further easier to manufacture the yokes. Further, no need for provision of the posts and pins can reduce the number or parts and the manufacturing cost of the toroidal-type continuously variable transmission.

In addition, according to the present invention, the toroidal-type continuously variable transmission as set forth in the second aspect of the present invention, wherein, in each of the yokes, a recess portion into which a leading end portion of the projection portion of each of the opposing members is inserted is formed.

That is, by inserting the leading end portions of the projection portions of the opposing members into the recess portions formed in the yokes, the yokes can be swingably supported on the projection portions of the yokes. Thanks to this, the centers of the swinging movements of the yokes can be made always constant, which can stabilize the swinging movements of the yokes.

Also, since there is eliminated the need for provision of posts and pins which are used to support the yokes swingably, there can be avoided not only the operation to form holes in the yokes for insertion of the posts and pins but also the operation to assemble the pins to the yokes, which makes it further easier to manufacture the yokes. Further, no need for provision of the posts and pins can reduce the number of parts and the manufacturing cost of the toroidal-type continuously variable transmission.

BRIEF DESCRIPTION OF THE DRAWINGS

FIG. 3A is a plan view of the yoke, and FIG. 3B is a side view of the yoke;

FIG. 6A is a plan view of the yoke, and FIG. 6B is a side view of the yoke;

FIG. 14A is a plan view of the yoke, and FIG. 14B is a side view of the yoke;

DETAILED DESCRIPTION OF THE PREFERRED EMBODIMENTS

Figure 16:
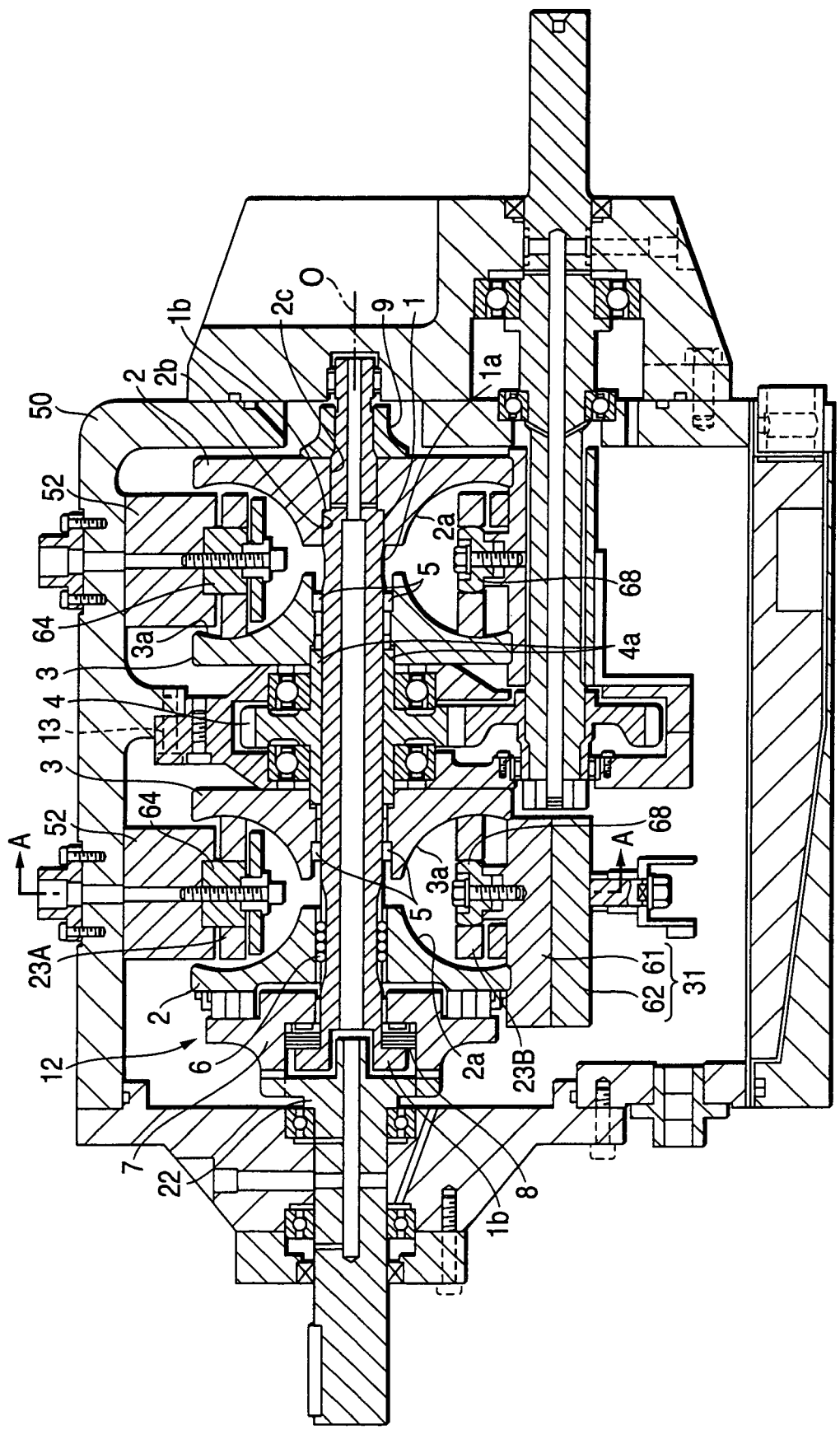
FIG. 16 is a section view of an example of a concrete structure of a conventional toroidal-type continuously variable transmission.
Figure 17:
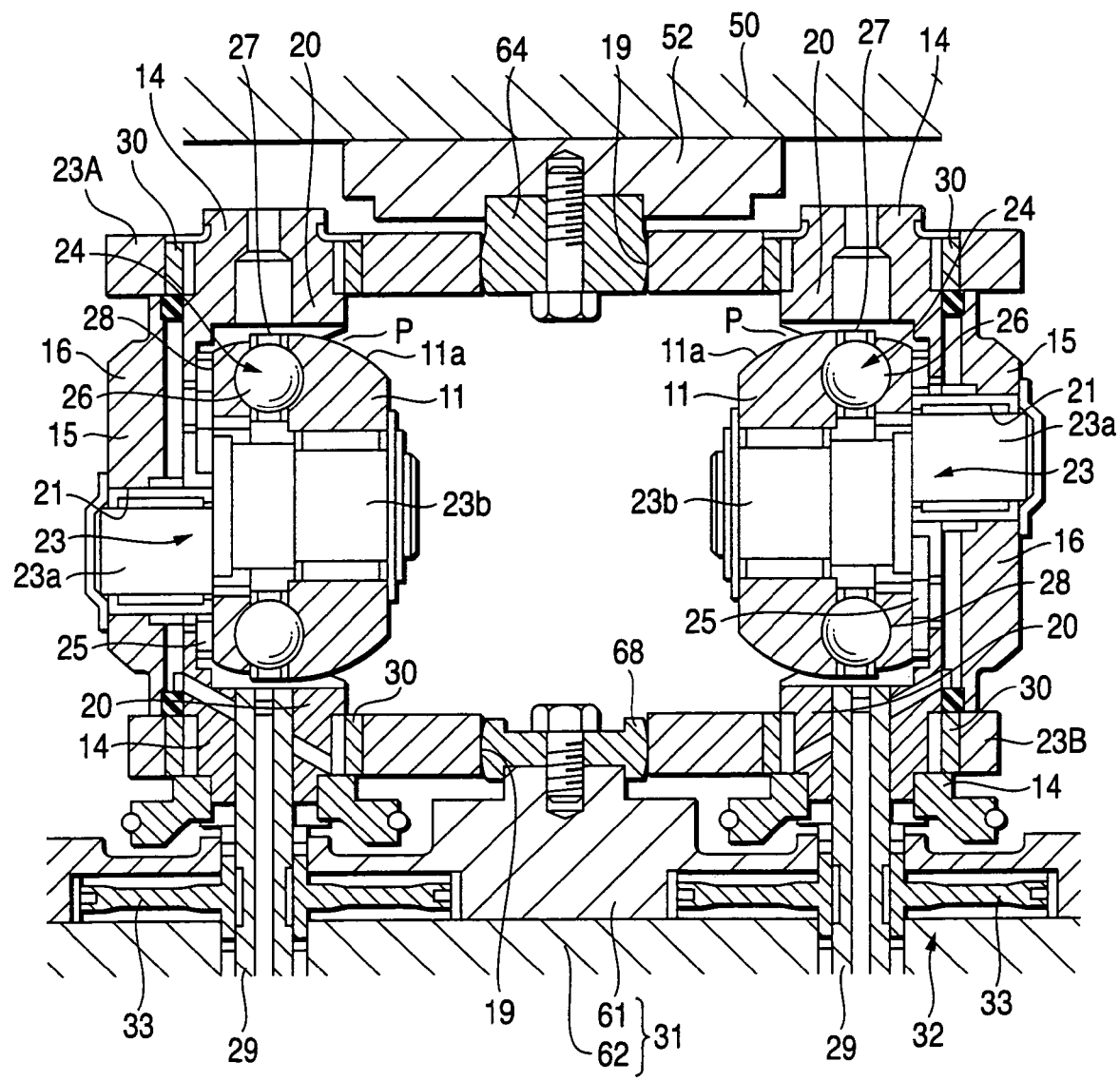
FIG. 17 is a section view taken along the line A-A shown in FIG. 16.
Figure 18:
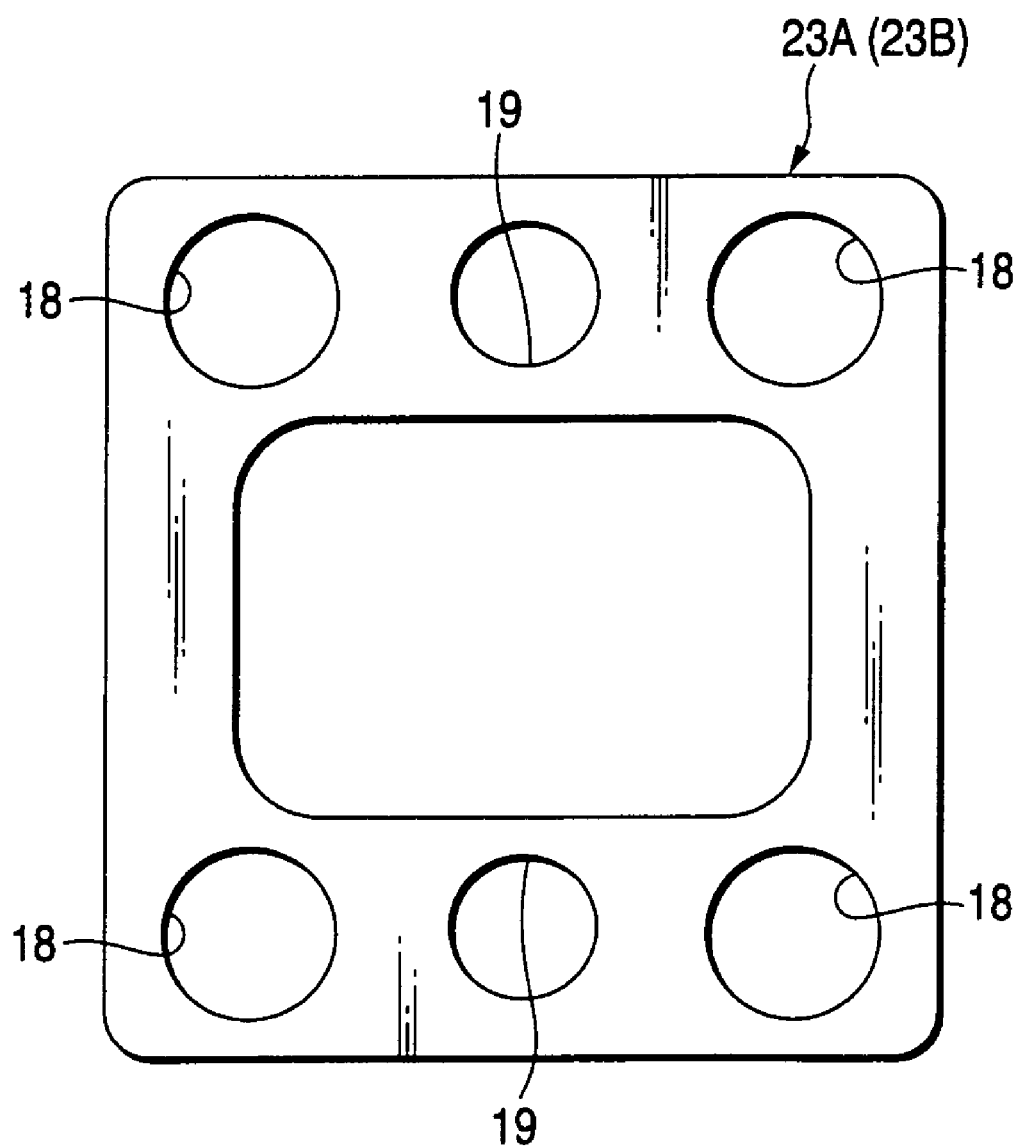
FIG. 18 is a plan view of the yoke shown in FIG. 16.

Now, description will be given below of the mode for carrying out the present invention with reference to the accompanying drawings. By the way, in the following drawings, like composing elements as in FIGS. 16 to 18, the same designations are given and thus the description thereof is simplified.

Figure 1:
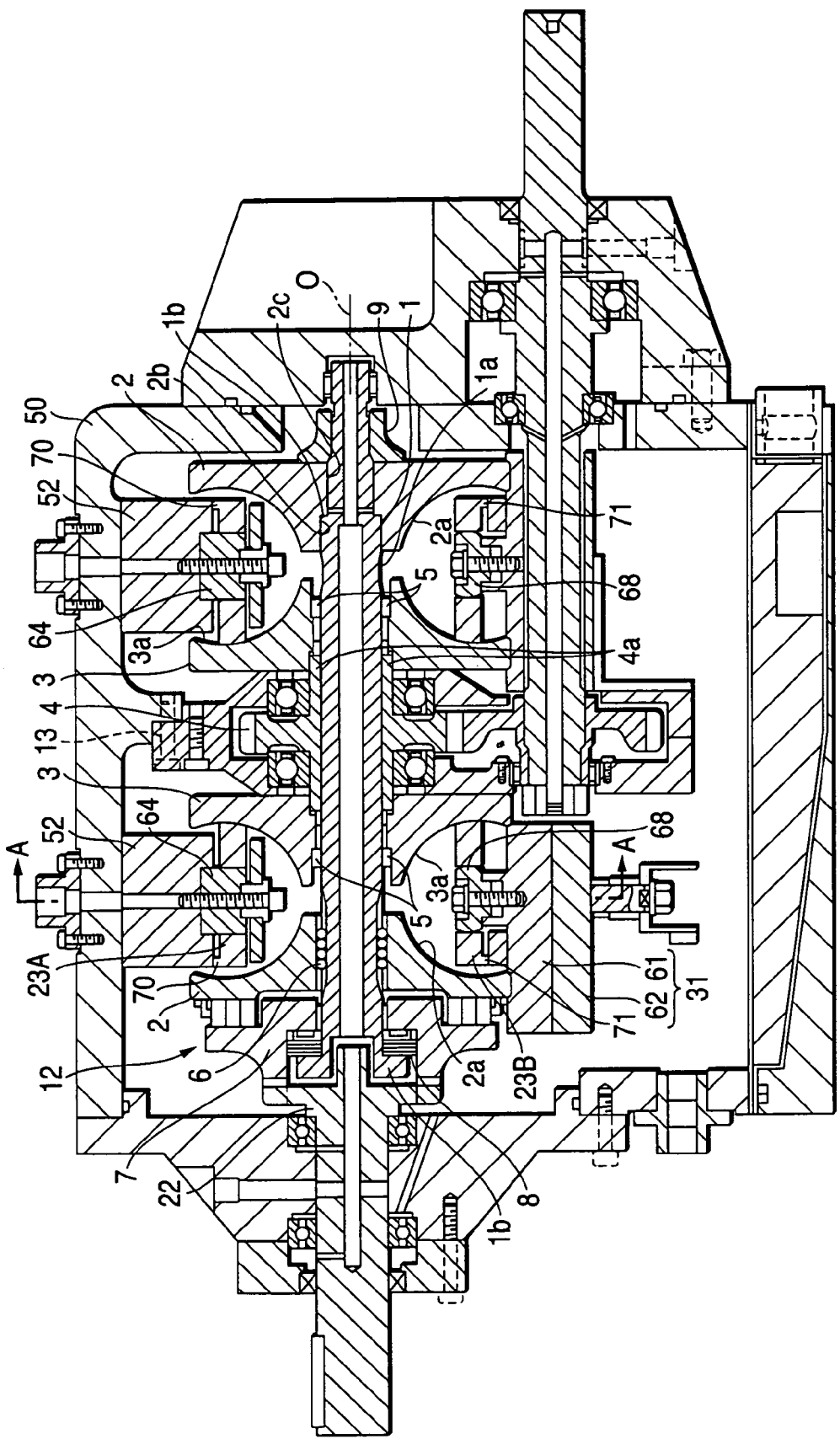
FIG. 1 is a section view of a toroidal-type continuously variable transmission according to a first embodiment of the present invention.
Figure 2:
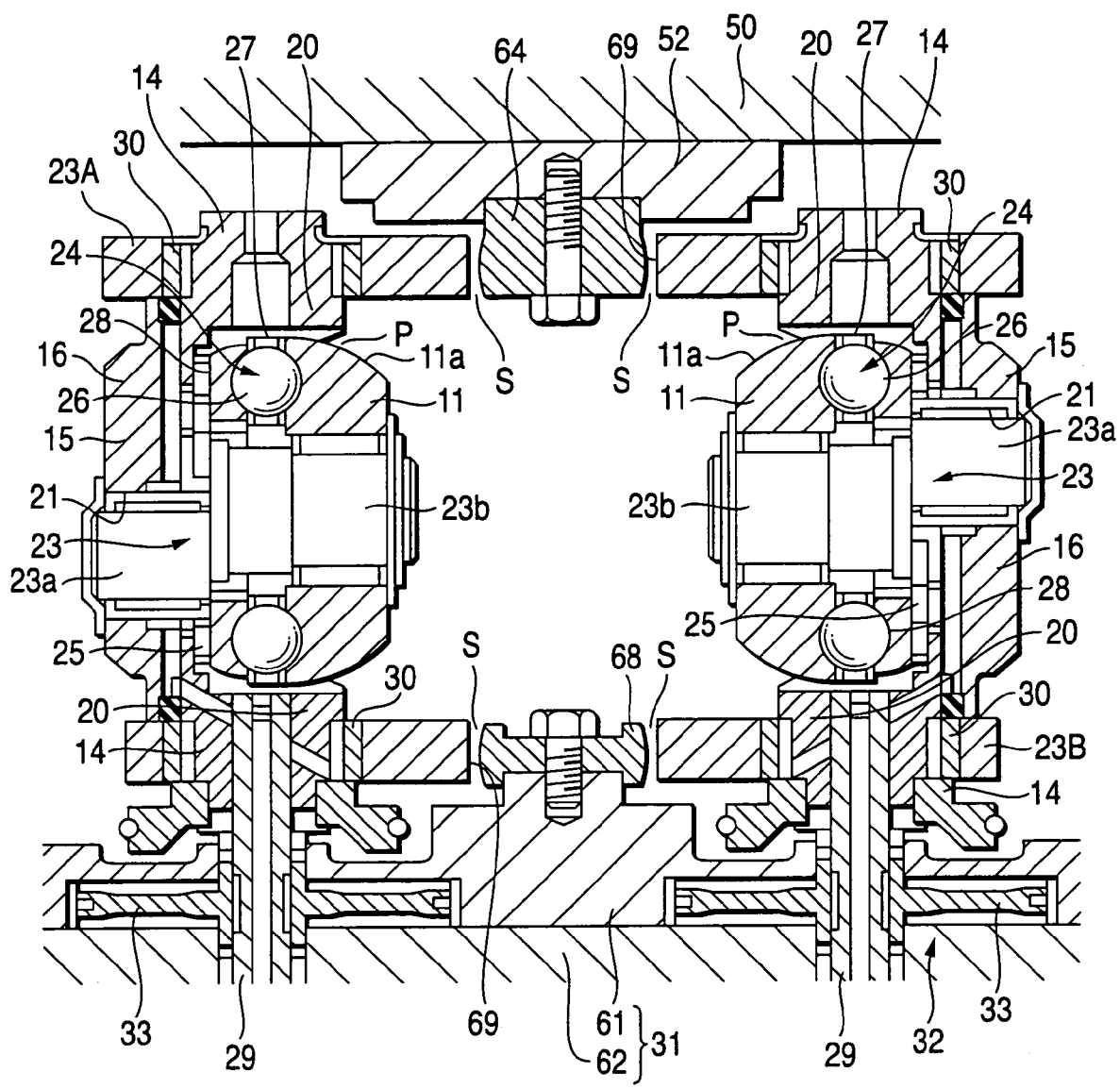
FIG. 2 is a section view taken along the line A-A shown in FIG. 1.
Figure 3A:
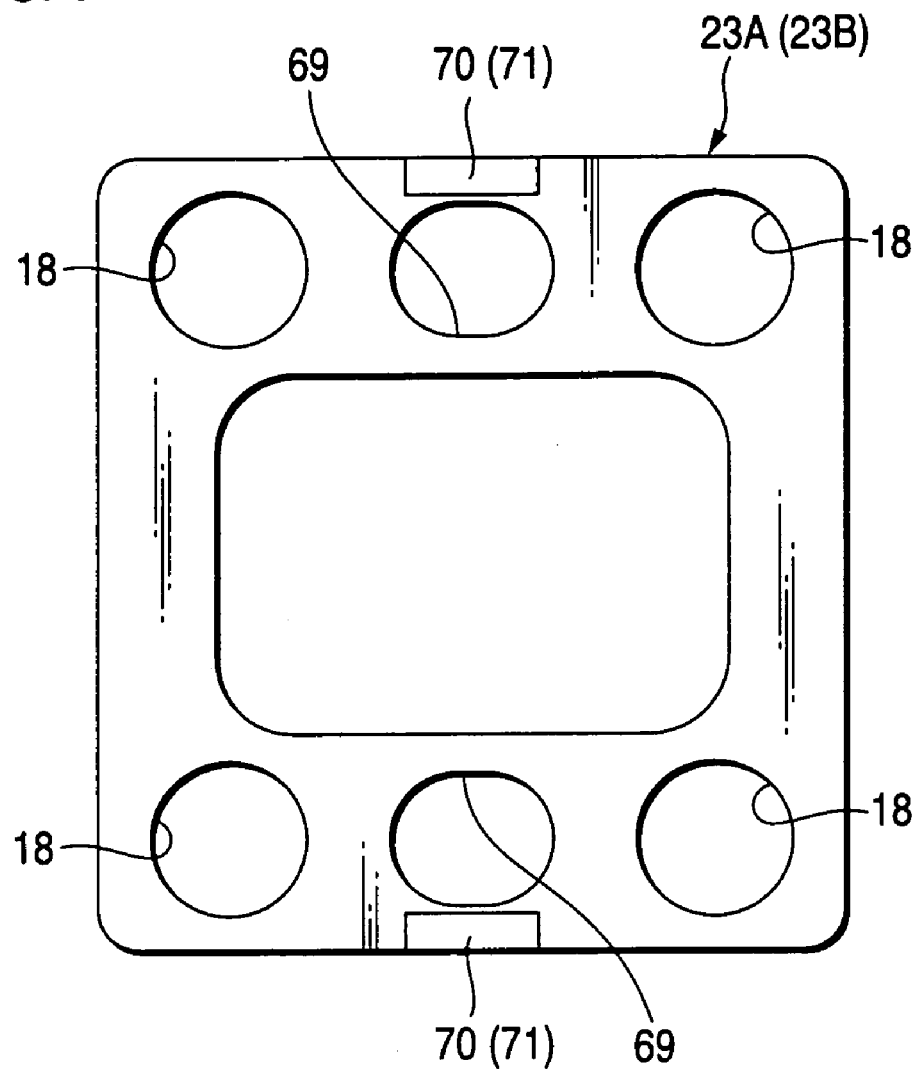
FIGS. 3A and 3B each shows a yoke shown in FIG. 1; specifically.
Figure 3B:
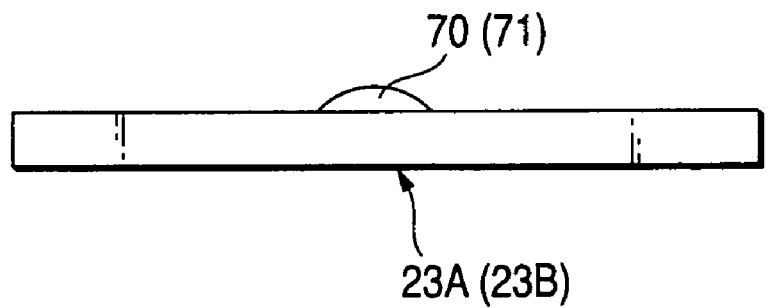

FIGS. 1 to 3 show a first embodiment of a toroidal-type continuously variable transmission according to the present invention. As shown in FIGS. 1 to 3, in the width-direction (in FIG. 1, in the front and back direction; and, in FIGS. 2 and 3, in the right and left direction) middle portions of each of yokes 23A, 23B that exist between support holes 18, 18, there are formed elongated-hole-shaped penetration holes 69, 69 through which spherical-shaped surface posts (restricting elements) 64, 68 can be inserted. The penetration holes 69, 69 are formed larger than the outside diameter of the spherical-shaped surface post 64, 68 in the width direction of the yokes 23A, 23B and, therefore, as shown in FIG. 2, between the penetration holes 69, 69 and spherical-shaped surface posts 64, 68, there are formed given clearances S, so that the yokes 23A, 23B can play in the width direction. That is, the width-direction movements of the yokes 23A, 23B are restricted by the spherical-shaped surface posts 64, 68 and the yokes 23A, 23B can be moved by an amount corresponding to the clearance S.

As shown in FIGS. 1 and 3, in the longitudinal-direction (in FIG. 1, in the right and left direction; and, in FIG. 3A, in the vertical direction) outer portions of the penetration holes 69, 69 of the yoke 23A, there are formed bow-shaped-plate-like projection portions 70, 70 projecting toward the fixing member 52 of a casing 50, that is an opposing member to the yoke 23A; and, the projection portions 70, 70 provide the fulcrums of the swinging movement of the yoke 23A.

Similarly, in the longitudinal-direction outer portions of the penetration holes 69, 69 of the yoke 23B as well, there are formed bow-shaped-plate-like projection portions 71, 71 projecting toward the upper valve body 61 of the cylinder 31, that is the opposing member of the yoke 23B, while the projection portions 71, 71 provide the fulcrums of the swinging movement of the yoke 23B.

Also, as shown in FIG. 1, the projection portions 70, 70 of the yoke 23A are contacted with the fixing member 52 of the casing 50 and the projection portions 71, 71 of the yoke 23B are contacted with the upper valve body 61, so that the yokes 23A, 23B can be respectively swung about their associated projection portions 70, 70, 71, 71.

In the above-structured toroidal-type continuously variable transmission, when the contact positions between the disks and the power rollers are changed, for example, a drive piston 33 situated on the left side in FIG. 2 is shifted downwardly in FIG. 2, while a drive piston 33 on the right side is shifted upwardly in FIG. 2. With the shifting movements of the drive pistons 33, 33, the trunnions 15, 15 connected to the drive pistons 33, 33 are shifted in the mutually opposite directions: that is, the left trunnion 15 is shifted upwardly in FIG. 2, while the right trunnion 15 is shifted downwardly in FIG. 2.

Figure 4A:
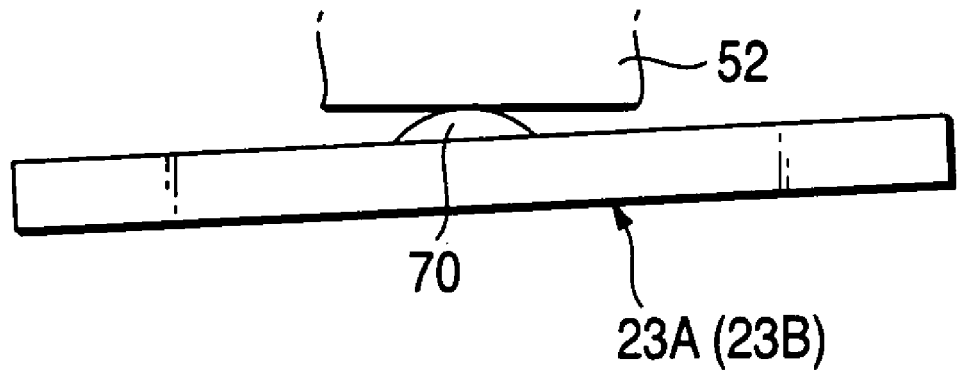
FIGS. 4A and 4B are explanatory views of the yoke, showing how the yoke swings in varying the speed ratio.

Due to this, as shown in FIG. 4A, the yoke 23A is inclined in a direction, where the right side of the yoke 23A in FIG. 4A is situated on the upper side, about the projection portions 70, 70 contacted with the fixing member 52 of the casing 50. Similarly, the yoke 23B is also inclined in the same direction of the yoke 23A about the projection portions 71, 71 contacted with the upper valve body 61 of the cylinder 31.

Figure 4B:
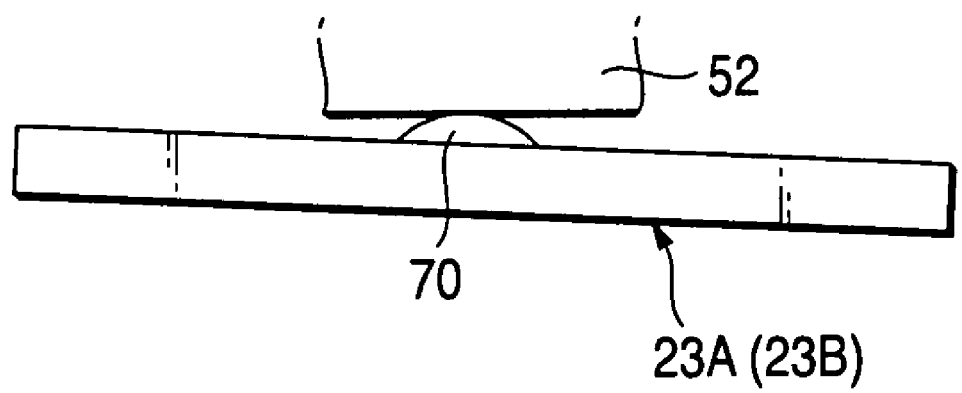

Also, in case where the left drive piston 33 shifts upwardly in FIG. 2 and the right drive piston 33 shifts downwardly in FIG. 2, as shown in FIG. 4B, the yoke 23A is inclined in a direction where the left side of the yoke 23A in FIG. 4B is situated on the upper side; and, the yoke 23B is also inclined in the same direction of the yoke 23A.

And, due to the swinging movements of the yokes 23A, 23B, the shifting movements of the trunnions 15, 15 supported by the yokes 23A, 23B can be synchronized with each other.

As described above, since the yokes 23A, 23B are swung about the bow-shaped-plate-like projection portions 70, 70, 71, 71 contacted with the fixing member 52 of the casing 50 and upper valve body 61, the swinging movements of the yokes 23A, 23B can be made smooth. This can synchronize the shifting movements of the trunnions 15, 15 supported on the yokes 23A, 23B with each other stably, which in turn can stabilize the transmission performance of the toroidal-type continuously variable transmission.

Also, because the present structure can be obtained by forming the projection portions 70, 70, 71, 71 in the yokes 23A, 23B, the manufacture of the yokes can be facilitated. Also, since there is eliminated the need for special provision of a pin or the like, the manufacturing cost of the yokes and thus the toroidal-type continuously variable transmission can be reduced.

And, because the clearance s are formed between the yokes 23A, 23B and spherical-shaped surface posts 64, 68, the yokes 23A, 23B can be moved by an amount corresponding to the clearance S. Thanks to this, even in case where the positions of the yokes 23A, 23B inside the casing 50 vary, or even in case where the positions of the contact portions between the peripheral surface 11a of the power roller 11 and disks 2, 3 vary according to the power rollers 11 due to variations in the assembling positions of the power rollers 11 with respect to the trunnions 15, the yokes 23A, 23B are allowed to move in the horizontal direction, thereby being able to correct the variations in the positions Of the contact portions.

Therefore, loads applied to the respective power rollers 11 can be made substantially uniform, which makes it possible to prevent the durability of the power rollers 11 from lowering, thereby being able to extend the lives of the power rollers 11.

Also, in order not to descend the durability of the power roller 11, since it is not necessary to set the positions of the yokes 23A, 23B inside the casing 50 and the assembling positions of the power rollers 11 with respect to the trunnions 15 with high accuracy, the assembling operations of these parts can be facilitated.

Figure 5:
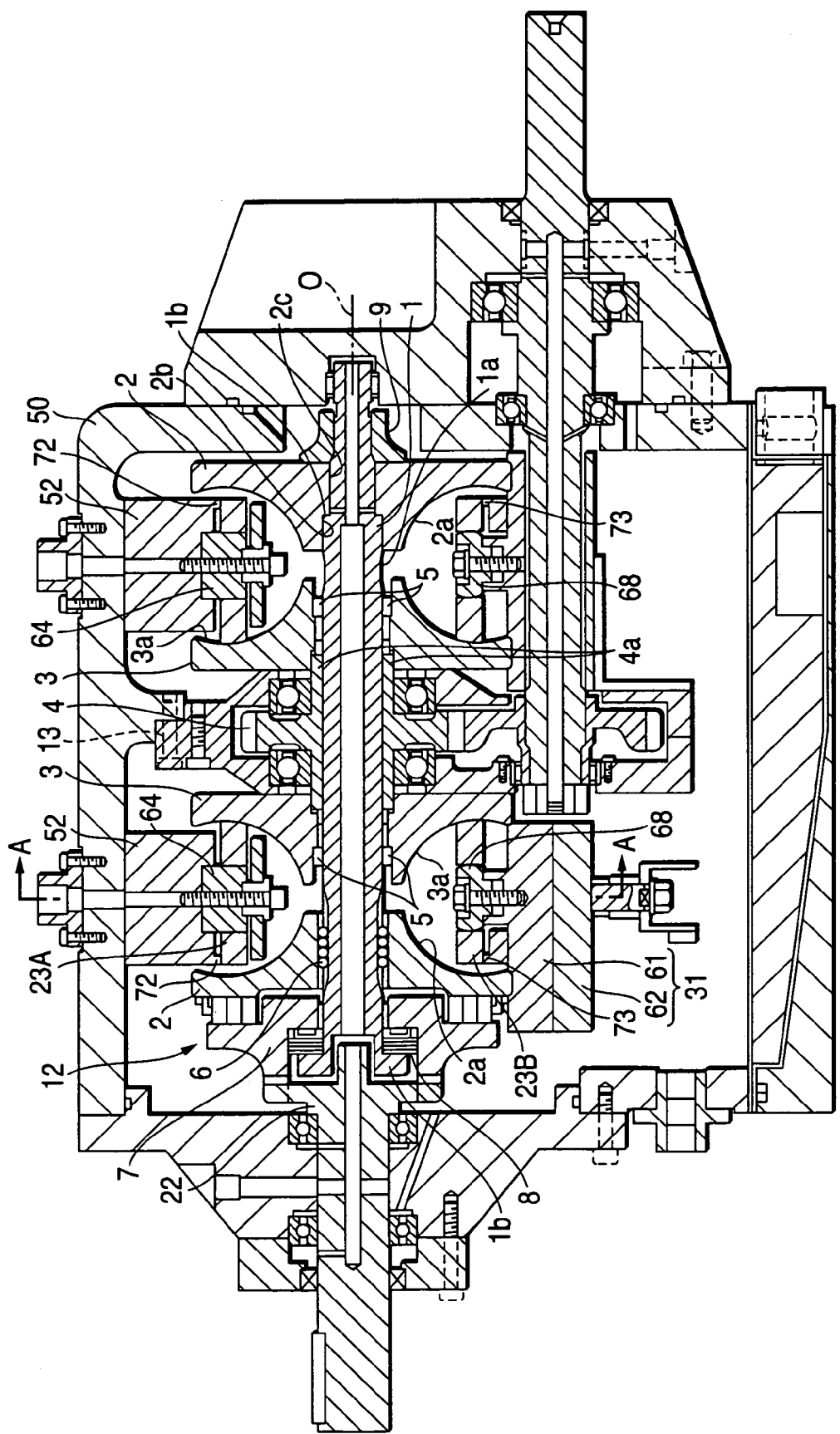
FIG. 5 is a section view of a toroidal-type continuously variable transmission according to a second embodiment of the present invention.

Now, FIGS. 5 to 7 show a second embodiment of a toroidal-type continuously variable transmission according to the present invention. By the way, in the present embodiment, the composing elements thereof similar to those of the first embodiment are given the same designations and thus the description thereof is simplified here.

As shown in FIG. 5, in the fixing member 52 of the casing 50 that is an opposing member to the yoke 23A, there are formed bow-shaped-plate-like projection portions 72, 72 which project toward the yoke 23A; and, in the upper valve body 61 of the cylinder 31 that is an opposing member to the yoke 23B, there are formed bow-shaped-plate-like projection portions 73, 73 which project toward the yoke 23B.

Figure 6A:
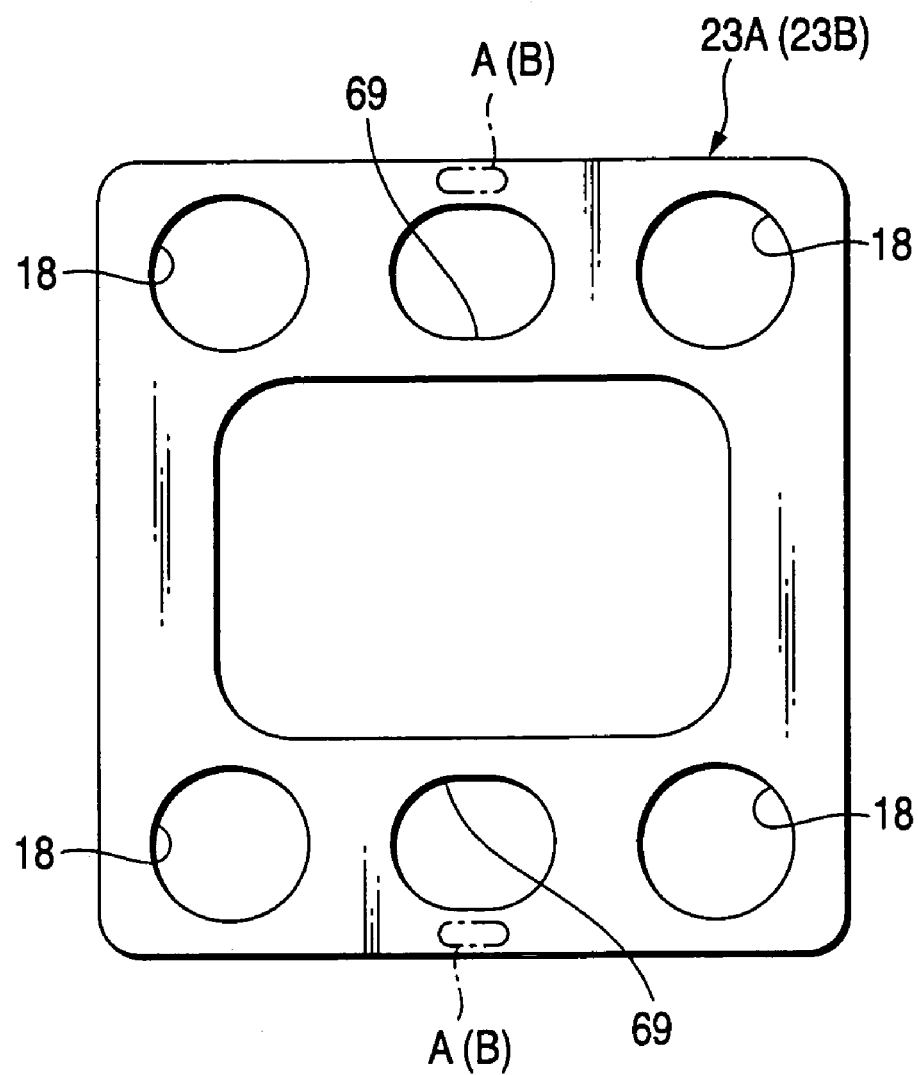
FIGS. 6A and 6B each shows the yoke shown in FIG. 5; specifically.
Figure 6B:
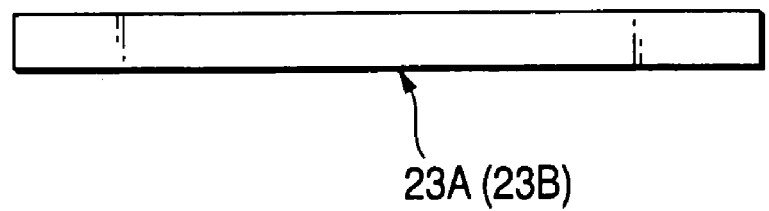

As shown in FIGS. 6A and 6B, the projection portions 72, 72 of the fixing member 52 of the casing 50 are contacted with the middle portions A of the yoke 23A that are situated between the two end portions of the yoke 23A crossing each other in the width direction of the yoke 23A; and, the projection portions 73, 73 of the upper valve body 61 are contacted with the middle portions B of the yoke 23B that are situated between the two end portions of the yoke 23B crossing each other in the width direction of the yoke 23B. Thus, the yokes 23A, 23B can be respectively swung about their associated projection portions 72, 72, 73, 73.

Figure 7A:
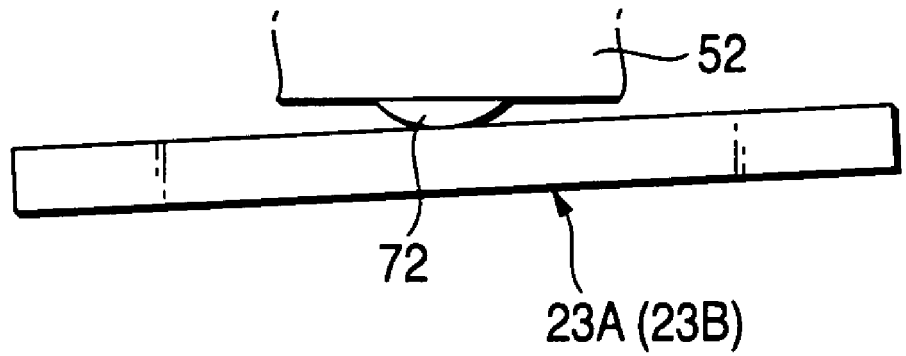
FIGS. 7A and 7B are explanatory views of the yoke, showing how the yoke swings in varying the speed ratio.
Figure 7B:
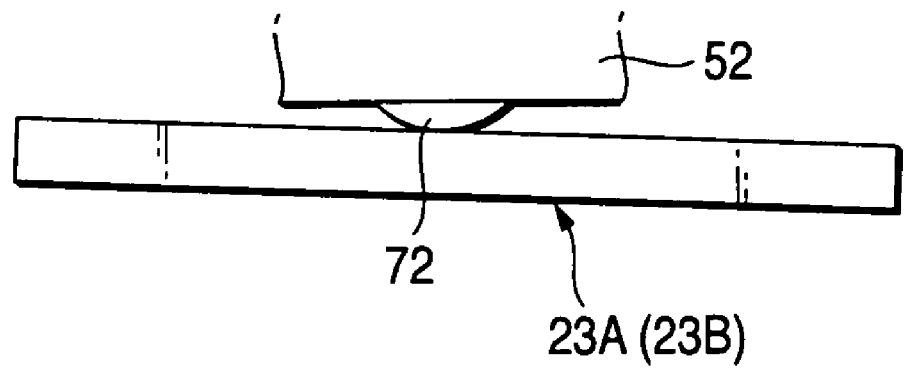

In the above-structured toroidal-type continuously variable transmission, as shown in FIG. 7A and FIG. 7B, when the contact positions between the disks and the power rollers are changed, the yoke 23A contacted with the projection portions 72, 72 formed in the fixing member 52 of the casing 50 is swung about these projection portions 72, 72. Similarly, the yoke 23B contacted with the projection portions 73, 73 formed in the upper valve body 61 of the cylinder 31 is also swung about these projection portions 73, 73. Therefore, in the present embodiment, there can be obtained similar effects to the first embodiment.

Now, FIGS. 8 to 11 show a third embodiment of a toroidal-type continuously variable transmission according to the present invention. By the way, in the present embodiment, the same composing elements thereof as the first embodiment are given the same designations and thus the description thereof is simplified here.

Figure 8:
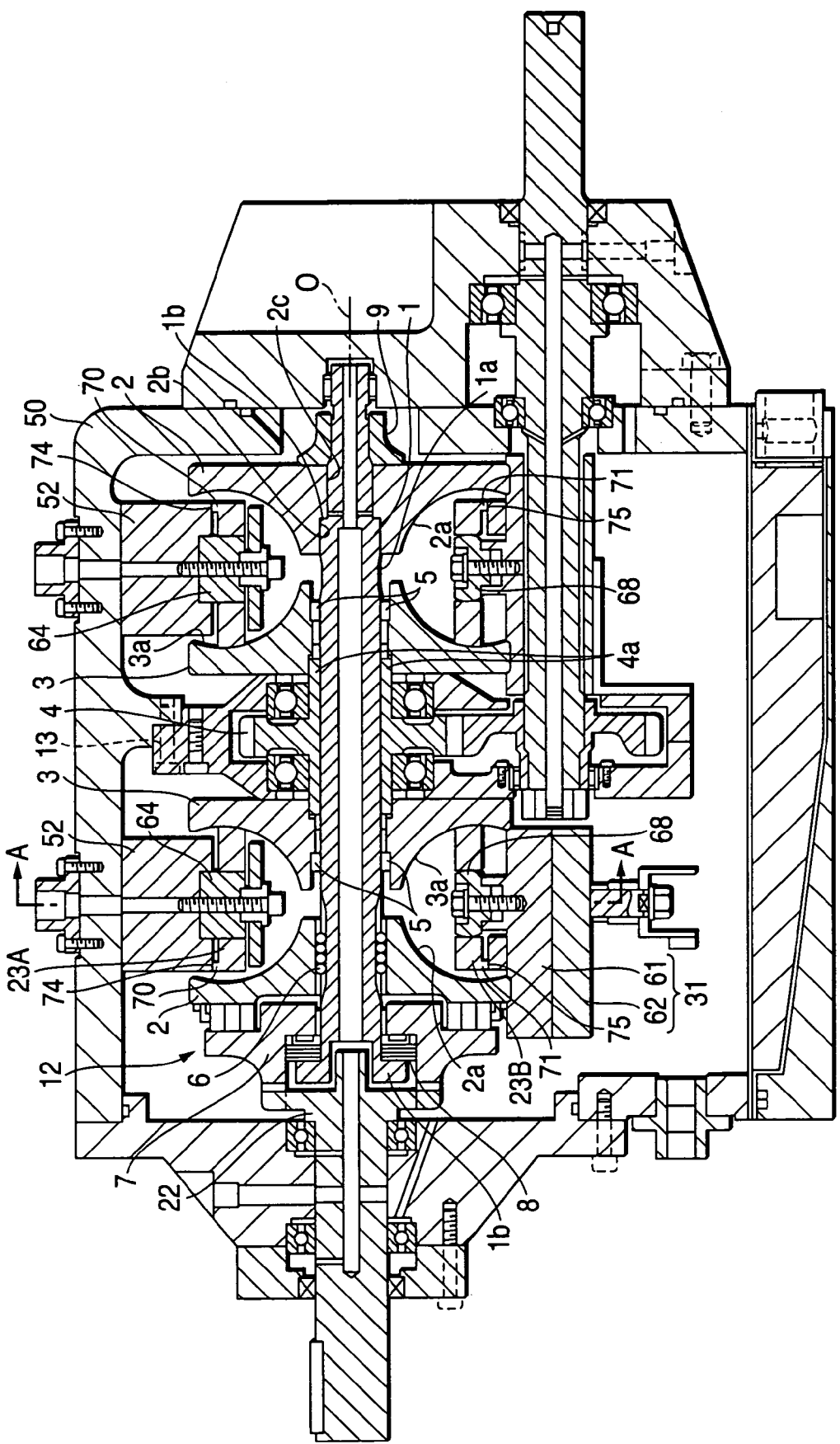
FIG. 8 is a section view of a toroidal-type continuously variable transmission according to a third embodiment of the present invention.
Figure 9:
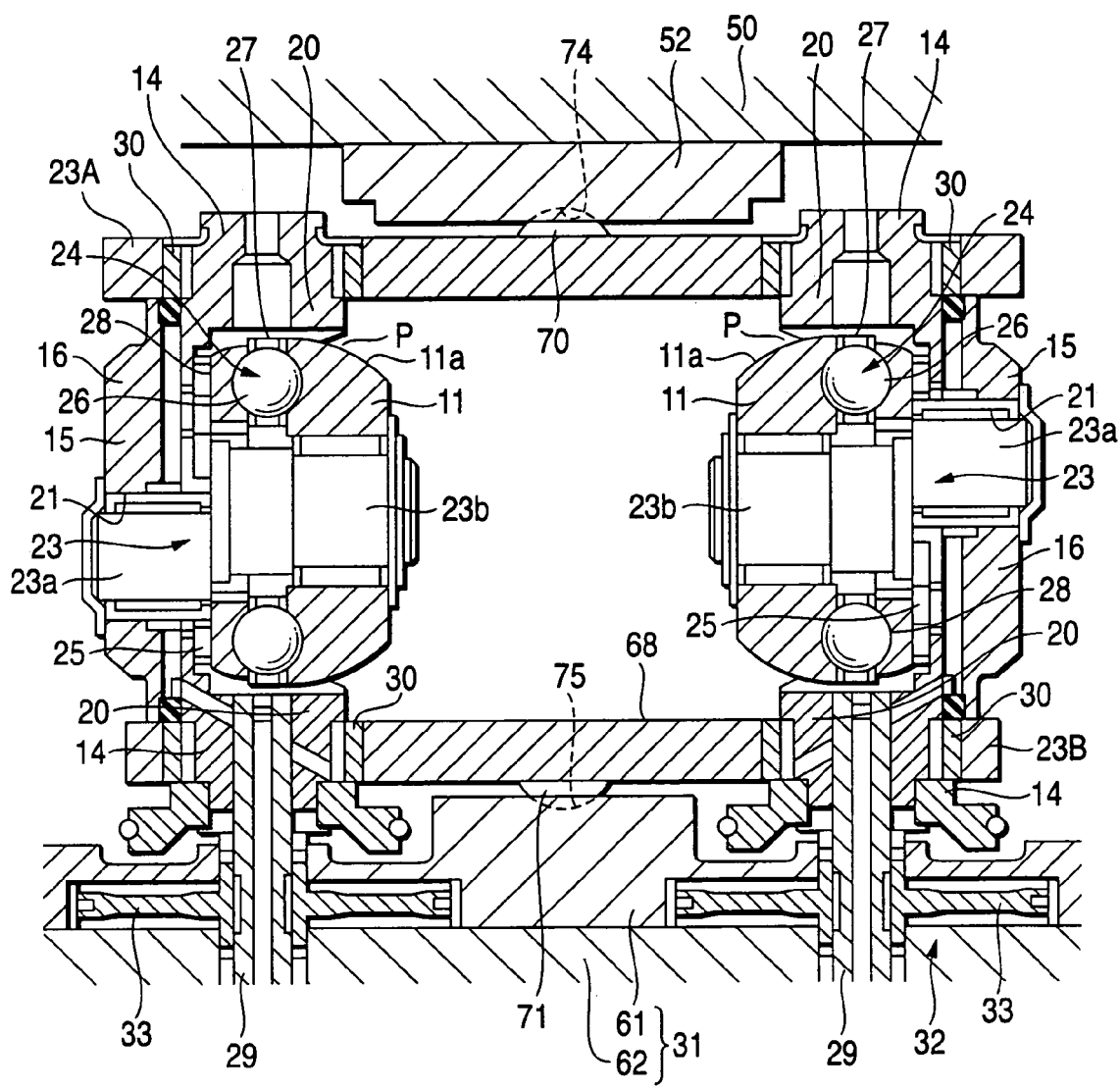
FIG. 9 is a section view taken along the line A-A shown in FIG. 8.

As shown in FIGS. 8 and 9, in the fixing member 52 of the casing 50, there are formed bow-shaped-plate-like recess portions 74, 74 with which the leading end portions of the projection portions 70, 70 of the yoke 23A can be fitted respectively. In case where the leading end portions of the projection portions 70, 70 of the yoke 23A are respectively fitted with the recess portions 74, 74 of the fixing member 52 of the casing 50, the yoke 23A is swingably supported by the recess portions 74, 74.

Also, in the upper valve body 61 of the cylinder 31, there are formed bow-shaped-plate-like recess portions 75, 75 with which the leading end portions of the projection portions 71, 71 of the yoke 23B can be fitted respectively. In case where the leading end portions of the projection portions 71, 71 of the yoke 23B are respectively fitted with the recess portions 75, 75 of the upper valve body 61, the yoke 23B is swingably supported by the recess portions 75, 75.

Figure 10:
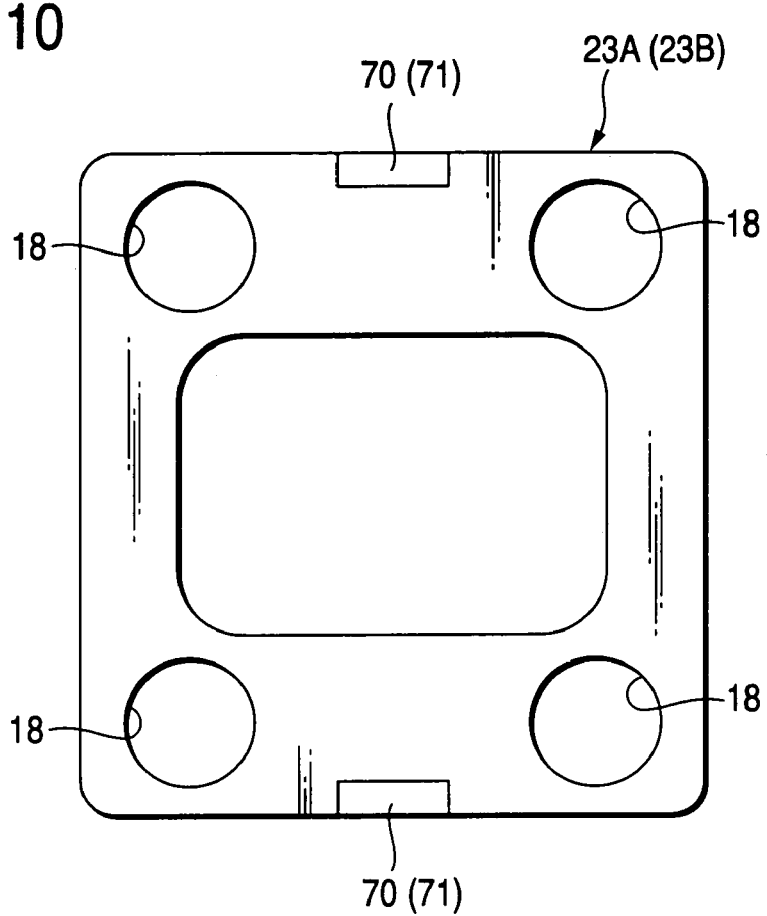
FIG. 10 is a plan view of the yoke shown in FIG. 8.

That is, according to the present embodiment, as shown in FIGS. 8 end 9, there are omitted the spherical-shaped surface posts 64, 68 (see FIGS. 1 and 2) which are used to support the yokes 23A, 23B in a swingable manner. Therefore, as shown in FIG. 10, in the yokes 23A, 23B, there are not formed penetration holes through which the spherical-shaped surface posts 64, 68 are inserted.

Figure 11A:
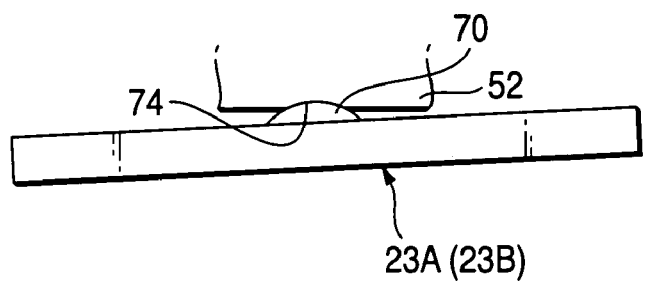
FIGS. 11A and 11B are explanatory views of the yoke, showing how the yoke swings in varying the speed ratio.
Figure 11B:
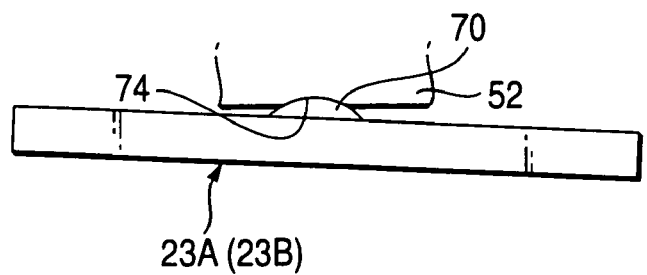

In the above-structured toroidal-type continuously variable transmission, as shown in FIGS. 11A and 11B, when the contact positions between the disks and the power rollers are changed, the yoke 23A is swung about the projection portions 70, 70 that are fitted with the recess portions 74, 74 formed in the fixing member 52 of the casing 50. Similarly, the yoke 23B is also swung about the projection portions 71, 71 fitted with the recess portions 75, 75 formed in the upper valve body 61 of the cylinder 31.

Therefore, according to the present embodiment, not only there can be obtained similar effects to the first embodiment but also the swinging centers of the yokes 23A, 23B are always constant to thereby be able to stabilize the swinging movements of the yokes 23A, 23B.

Also, because there is eliminated the need for provision of spherical-shaped surface posts and pins which are used to support the yokes 23A, 23B in a swingable manner, there can be eliminated not only the operation to form holes in the yokes 23A, 23B for insertion of the spherical-shaped surface posts and pins but also the operation to assemble the pins to the yokes 23A, 23B, thereby being able to facilitate further the manufacture of the yokes 23A, 23B. And, since it is not necessary to use the spherical-shaped surface posts and pins, the number of parts can be reduced and thus the manufacturing cost of the toroidal-type continuously variable transmission can be reduced further.

Now, FIGS. 12 to 15 show a fourth embodiment of a toroidal-type continuously variable transmission according to the present invention. By the way, in the present embodiment, the similar composing elements thereof to the first embodiment are given the same designations and thus the description thereof is simplified here.

Figure 12:
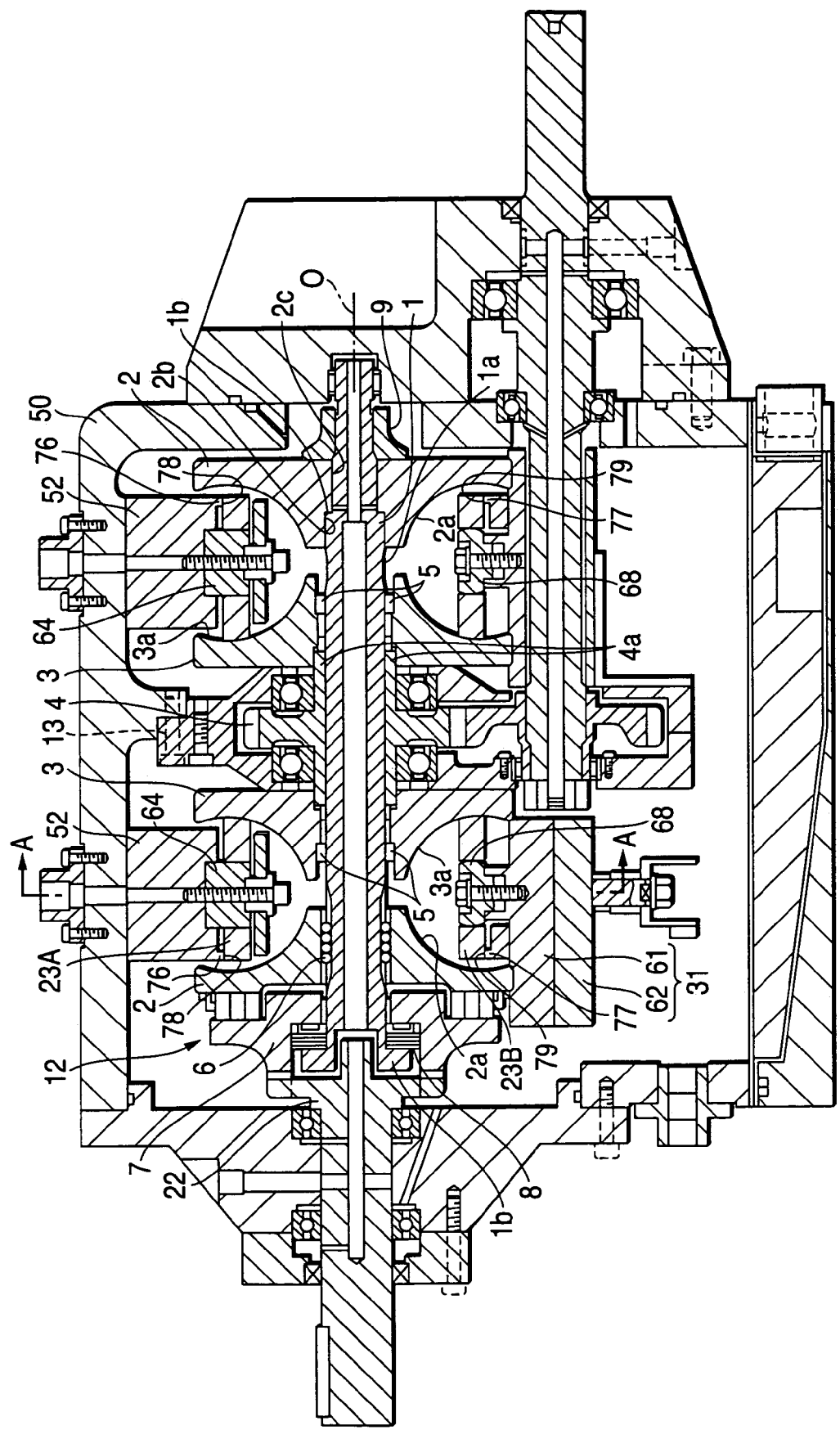
FIG. 12 is a section view of a toroidal-type continuously variable transmission according to a fourth embodiment of the present invention.
Figure 13:
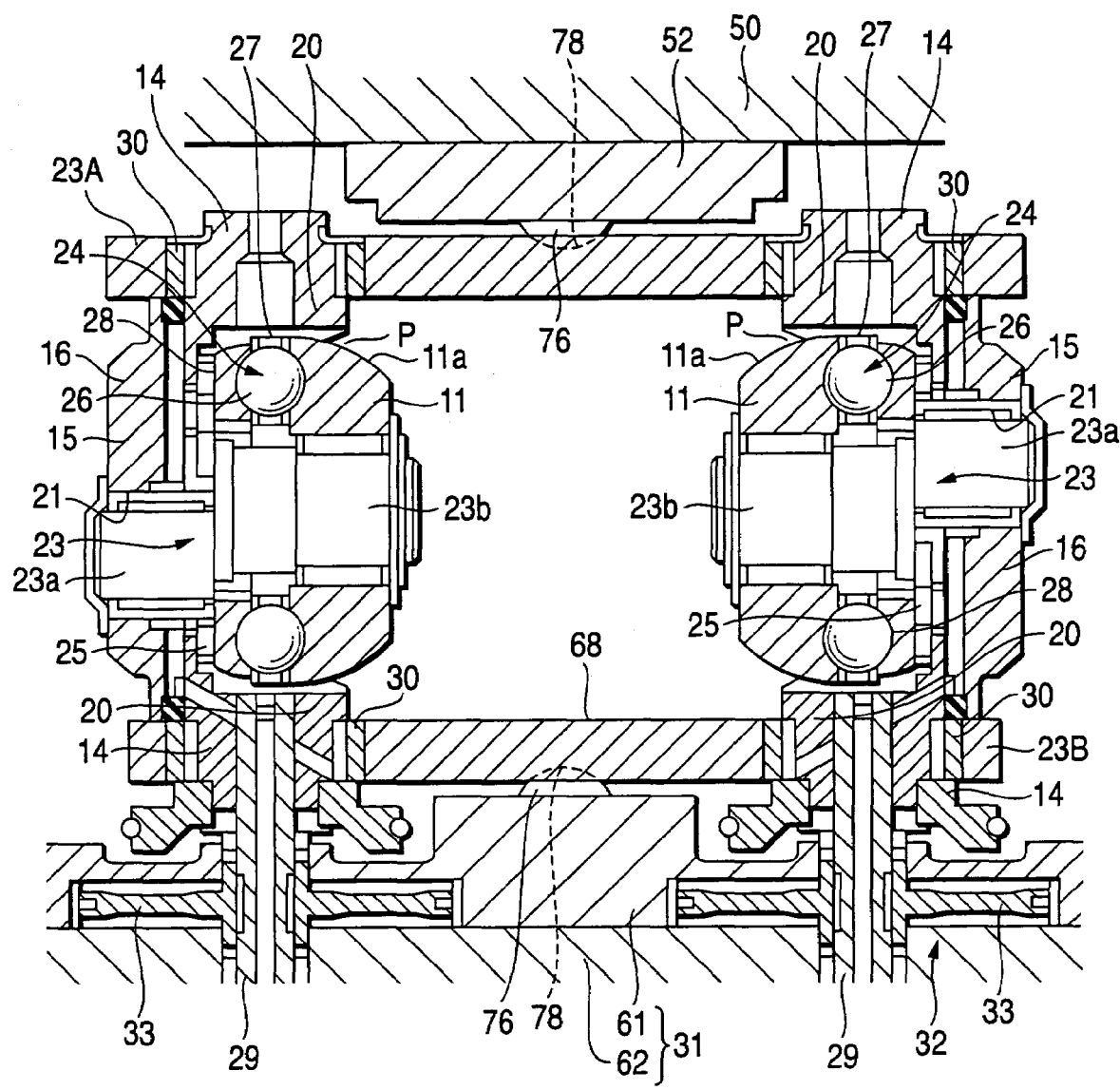
FIG. 13 is a section view taken along the line A-A shown in FIG. 12.

As shown in FIGS. 12 and 13, in the fixing member 52 of the casing 50, there formed integrally therewith bow-shaped-plate-like projection portions 76, 76 which project toward the yoke 23A. Also, in the upper valve body 61 of the cylinder 31, there are formed bow-shaped-plate-like projection portions 77, 77 which project toward the yoke 23B.

Figure 14A:
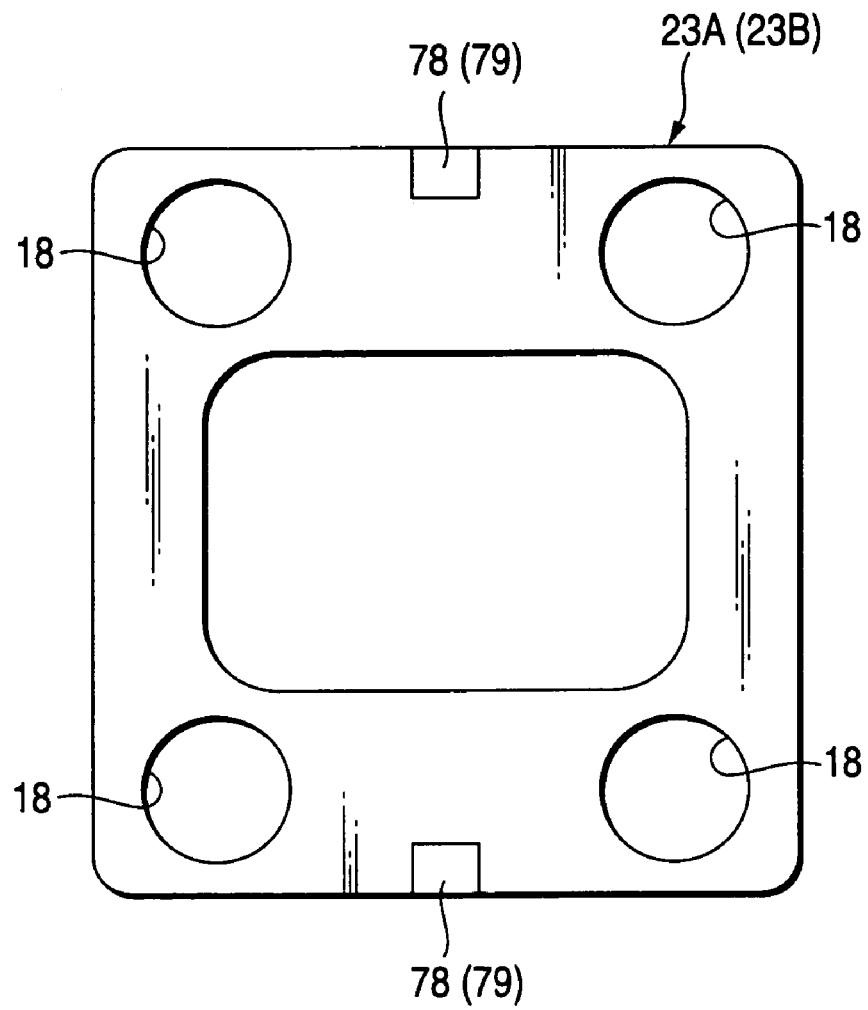
FIGS. 14A and 14B each shows the yoke shown in FIG. 12; specifically.
Figure 14B:
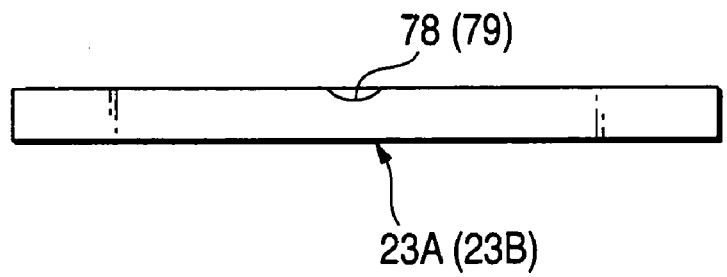

Also, as shown in FIGS. 14A and 14B, in the middle portions of the longitudinal-direction two end portions of the yokes 23A, 23B, there are formed bow-shaped-plate-like recess portions 78, 78, 79, 79 with which the leading end portions of the projection portions 76, 76, 77, 77 can be fitted respectively.

In case where the leading end portions of the projection portions 76, 76, 77, 77 are respectively fitted with the recess portions 78, 78, 79, 79, the yokes 23A, 23B are swingably supported by the projection portions 76, 76, 77, 77.

That is, according to the present embodiment, as shown in FIGS. 12 and 13, there are not formed the spherical-shaped surface posts 64, 68 (see FIGS. 1 and 2) which are used to support the yokes 23A, 23B in a swingable manner. Therefore, as shown in FIGS. 14A and 14B, in the yokes 23A, 23D, there are not formed penetration holes through which the spherical-shaped surface posts 64, 66 are inserted.

Figure 15A:
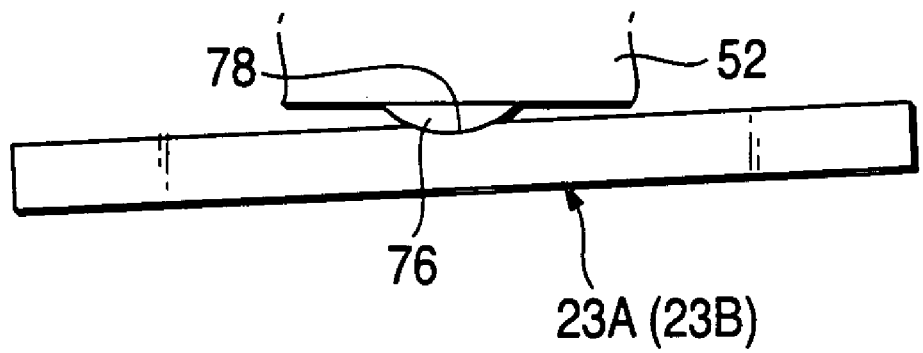
FIGS. 15A and 15B are explanatory views of the yoke, showing how the yoke swings in varying the speed ratio.
Figure 15B:
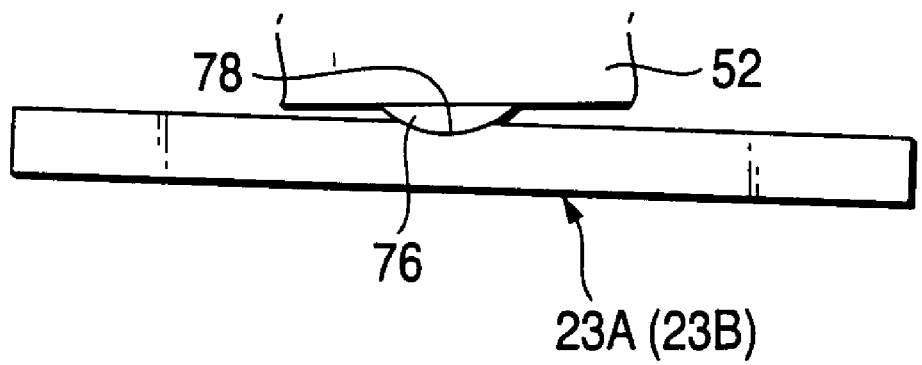

In the above-structured toroidal-type continuously variable transmission, as shown in FIGS. 15A and 15B, when the contact positions between the disks and the power rollers are changed, the yoke 23A is swung about the recess portions 78, 78 fitted with the leading end portions of the projection portions 76, 76 formed in the fixing member 52 of the casing 50. Similarly, the yoke 23B is also swung about the recess portions 78, 78 fitted with the leading end portions of the projection portions 77, 77 formed in the upper valve body 61 or the cylinder 31.

Therefore, according to the present embodiment, not only there can be obtained similar effects to the first embodiment but also the swinging centers of the yokes 23A, 23B can be always kept constant to thereby be able to stabilize the swinging movements of the yokes 23A, 23B.

Also, since there is eliminated the need for provision of the spherical-shaped surface posts and pins which are used to support the yokes 23A, 23B in a swingable manner, there can be eliminated not only the operation to form holes through which the spherical-shaped surface posts and pins are inserted but also the operation to assemble the pins to the yokes 23A, 23B, which makes it possible to facilitate further the manufacture of the yokes 23A, 23B. Further, because it is not necessary to use the spherical-shaped surface posts and pins, the number of parts can be reduced and thus the manufacturing cost of the toroidal-type continuously variable transmission can be reduced further.

By the way, the present invention is not limited to the above-described embodiments but various modifications are possible without departing from the gist of the present invention.

For example, in the first and third embodiments, in the yokes 23A, 23B, there are formed the projection portions 70, 70, 71, 71 integrally with them. However, the projection portions 70, 70, 71, 71 may also be formed separately from the yokes 23A, 23B.

Similarly, in the second embodiment as well, the projection portions 72, 72 of the fixing member 52 of the casing 50 and the projection portions 73, 73 of the upper valve body 61 of the cylinder 31 may also be formed separately from the fixing member 52 of the casing 50 and the upper valve body 61 of the cylinder 31.

Further, in the fourth embodiment as well, the projection portions 76, 76 of the fixing member 52 of the casing 50 and the projection portions 77, 77 of the upper valve body 61 of the cylinder 31 may also be formed separately from the fixing member 52 of the casing 50 and the upper valve body 61 of the cylinder 31.

Also, in the first and third embodiments, the projection portions 70, 71 of the yokes 23A, 23B are formed in a bow-shaped-plate-like shape. However, the shape of the projection portions 70, 71 is not limited to this but, for example, they may have a shape the leading end portion of which is rounded like a semi-spherical shape or a substantially triangular shape. This applies similarly to the projection portions 72, 73 in the second embodiment as well as to the projection portions 76, 77 in the fourth embodiment.

By the way, in case where the leading end portions of the projection portions 70, 71, 72, 73, 76, 77 are rounded, the swinging movements of the yokes 23A, 23B can be made further smoother.

Also, in the above-mentioned respective embodiments, as the opposing members to the yokes, there are used the fixing member 52 of the casing 50 and the upper valve body 61 of the cylinder 31; however, instead of them, the casing 50 may be used as the opposing member.

As has been described heretofore, according to the toroidal-type continuously variable transmission of the present invention, not only the manufacture of a yoke can be facilitated but also the manufacturing cost of the yoke and thus the toroidal-type continuously variable transmission can be reduced.

What is claimed is:

1. A continuously variable transmission, comprising:
a casing;
an input disk and an output disk having inner surfaces respectively and rotatably supported concentrically with each other in the casing in such a manner that the inner surfaces are opposed to each other;
a plurality of power rollers each held between the input and output disks;
a plurality of trunnions each having a pair of pivot shafts disposed at positions twisted with respect to a center axis of the input and output disks and concentric with each other, the trunnion supporting the associated power roller so as to be rotated;
a drive device for shifting the trunnions in the axial directions of the pivot shafts;
a pair of yokes for supporting the pivot shafts of each of the trunnions so as to be swung and shifted in the axial direction thereof, the yokes being flat plates and swingable according to the shifting movement of the associated trunnion; and,
a pair of opposing members each disposed to be opposed to the associated yoke,
wherein each of the yokes includes a projection portion contacted with the associated opposing member, the projection portion being the fulcrum of the swinging movement of the associated yoke, and wherein each of the projection portions projects in a direction that intersects with a plane of the yoke.

2. The continuously variable transmission as set forth in claim 1, wherein, in each of the opposing members, a recess portion into which a leading end portion of the projection portion of each of the yoke is inserted is formed.

3. The continuously variable transmission as set forth in claim 1, wherein each of the projection portions is monolithically formed with the yoke.

4. The continuously variable transmission as set forth in claim 1, wherein each of the projection portions is not a pin.

5. A continuously variable transmission, comprising:
a casing;
an input disk and an output disk having inner surfaces respectively and rotatably supported concentrically with each other in the casing in such a manner that the inner surfaces are opposed to each other;
a plurality of power rollers each held between the input and output disks;
a plurality of trunnions each having a pair of pivot shafts disposed at positions twisted with respect to a center axis of the input and output disks and concentric with each other, the trunnion supporting the associated power roller so as to be rotated;
a drive device for shifting the trunnions in the axial directions of the pivot shafts;
a pair of yokes for supporting the pivot shafts of each of the trunnions so as to be swung and shifted in the axial direction thereof, the yokes being flat plates and swingable according to the shifting movement of the associated trunnion; and,
a pair of opposing members each disposed to be opposed to the associated yoke,
wherein each of the opposing members includes a projection portion contacted with the associated yoke, a contact point of the projection portion and the opposing member being the fulcrum of the swinging movement of the associated yoke, and wherein each of the projection portions projects in a direction that intersects with a plane of the yoke.

6. The continuously variable transmission as set forth in claim 5, wherein, in each of the yokes, a recess portion into which a leading end portion of the projection portion of each of the opposing members is inserted is formed.

7. The continuously variable transmission as set forth in claim 5, wherein each of the projection portions is monolithically formed with the opposing member.

8. The continuously variable transmission as set forth in claim 5, wherein each of the projection portions is not a pin.

9. A continuously variable transmission, comprising:
a casing;
an input disk and an output disk having inner surfaces respectively and rotatably supported concentrically with each other in the casing in such a manner that the inner surfaces are opposed to each other;
a plurality of power rollers each held between the input and output disks;
a plurality of trunnions each having a pair of pivot shafts disposed at positions twisted with respect to a center axis of the input and output disks and concentric with each other, the trunnion supporting the associated power roller so as to be rotated;
a drive device for shifting the trunnions in the axial directions of the pivot shafts;
a pair of yokes for supporting the pivot shafts of each of the trunnions so as to be swung and shifted in the axial direction thereof, the yokes being flat plates and swingable according to the shifting movement of the associated trunnion; and,
a pair of opposing members each disposed to be opposed to the associated yoke,
wherein each of the yokes includes a projection portion contacted with the associated opposing member, the projection portion being the fulcrum of the swinging movement of the associated yoke, and wherein each of the projection portions projects in a direction that intersects with a plane of the yoke, and
wherein each of the yokes forms a penetration hole therein, the toroidal-type continuously variable transmission further includes a restricting member inserted into the penetration hole of the yoke and restricting the movement of the yoke in the horizontal direction, and a clearance is formed between the restricting member and the penetration hole.

10. A continuously variable transmission, comprising:
a casing;
an input disk and an output disk having inner surfaces respectively and rotatably supported concentrically with each other in the casing in such a manner that the inner surfaces are opposed to each other;
a plurality of power rollers each held between the input and output disks;
a plurality of trunnions each having a pair of pivot shafts disposed at positions twisted with respect to a center axis of the input and output disks and concentric with each other, the trunnion supporting the associated power roller so as to be rotated;
a drive device for shifting the trunnions in the axial directions of the pivot shafts;
a pair of yokes for supporting the pivot shafts of each of the trunnions so as to be swung and shifted in the axial direction thereof, the yokes being flat plates and swingable according to the shifting movement of the associated trunnion; and,
a pair of opposing members each disposed to be opposed to the associated yoke,
wherein each of the opposing members includes a projection portion contacted with the associated yoke, a contact point of the projection portion and the opposing member being the fulcrum of the swinging movement of the associated yoke, and wherein each of the projection portions projects in a direction that intersects with a plane of the yoke, and
wherein each of the yokes forms a penetration hole therein, in the toroidal-type continuously variable transmission further includes a restricting member inserted into the penetration hole of the yoke and restricting the movement of the yoke in the horizontal direction, and a clearance is formed between the restricting member and the penetration hole.

* * * * *